(12) United States Patent
Jones et al.

(10) Patent No.: US 9,239,768 B2
(45) Date of Patent: Jan. 19, 2016

(54) DISTRIBUTED PIN MAP MEMORY

(71) Applicant: Advantest Corporation, Tokyo (JP)

(72) Inventors: Michael Jones, San Carlos, CA (US);
Scott Bloom, Fort Collins, CO (US)

(73) Assignee: ADVANTEST CORPORATION, Tokyo (JP)

( * ) Notice: Subject to any disclaimer, the term of this patent is extended or adjusted under 35 U.S.C. 154(b) by 210 days.

(21) Appl. No.: 13/972,161

(22) Filed: Aug. 21, 2013

(65) Prior Publication Data
US 2015/0058677 A1    Feb. 26, 2015

(51) Int. Cl.
G06F 11/00    (2006.01)
G06F 11/22    (2006.01)

(52) U.S. Cl.
CPC ................. *G06F 11/2221* (2013.01)

(58) Field of Classification Search
CPC .................................................. G06F 11/2221
USPC ....................................................... 714/27, 42
See application file for complete search history.

(56) References Cited

U.S. PATENT DOCUMENTS

| | | | | |
|---|---|---|---|---|
| 5,862,366 | A  * | 1/1999 | Schmidt et al. | 703/21 |
| 2001/0042225 | A1* | 11/2001 | Cepulis et al. | 714/25 |
| 2004/0243769 | A1* | 12/2004 | Frame et al. | 711/148 |
| 2005/0160319 | A1* | 7/2005 | Marcak et al. | 714/32 |
| 2009/0031070 | A1* | 1/2009 | Purcell et al. | 710/316 |

* cited by examiner

*Primary Examiner* — Dieu-Minh Le

(57) ABSTRACT

In a testing device, a method for implementing distributed pin mapping. The method includes receiving a request from a plurality of CPUs to access a pin map memory at each of a plurality of bridges, implementing accesses to the pin map memories locally at each of the plurality of bridges, and using pin map data from the accesses to the plurality of CPUs to enable access to testing device resources.

19 Claims, 4 Drawing Sheets

"CRM1" = 1 half-bridge, sharing a CPU
"CRM2" = 2 half-bridges (1 bridge) with own CPU
"CRM3" = 3 half-bridges with a master CPU and a shared slave CPU
"CRM4" = 4 half-bridges (2 bridges) with a master CPU and a slave CPU
"CRM6" = 6 half-bridges (3 bridges) with a master CPU and two slave CPUs
"CRM12" = 12 half-bridges (6 bridges on 2 PEMs) with a master CPU and five slave CPUs

DISTRIBUTED PIN MAP MEMORY

FIELD OF THE INVENTION

The present invention is generally related to computer system test equipment.

BACKGROUND OF THE INVENTION

With the increasing popularity of smartphones, multifunctional portable devices, and SSDs, demand for NAND flash memory has skyrocketed. The global NAND market is set to grow 18% in 2011. Moreover, NAND flash device capacity and speed is also increasing. Average data transmission speeds have climbed ten-fold to 400 Mbps. These technological innovations, together with the proliferation of end-product markets, are driving explosive bit growth and production volume increases, and reinforcing a trend towards longer device test times. With device speeds expected to increase further, NAND manufacturers require a test system that lowers test costs while offering an operating frequency range that can support high-speed interfaces.

Thus there exists a need for next-generation NAND flash memory test solutions that can scale to meet the coming demands of high-speed testing. There exists a need for technology that delivers unprecedented test time and test cost reductions.

SUMMARY OF THE INVENTION

In one embodiment, the present invention is implemented as a method for implementing distributed pin mapping in a testing device. The method includes receiving a request from a plurality of CPUs to access a pin map memory at each of a plurality of bridges, implementing accesses to the pin map memories locally at each of the plurality of bridges, and using pin map data from the accesses to the plurality of CPUs to enable access to testing device resources.

In one embodiment, the testing device comprises a plurality of pin electronics modules.

In one embodiment, the testing device comprises a plurality of pin electronics modules and each of the pin electronics modules includes a plurality of bridge components and a plurality of CPUs.

In one embodiment, the testing device comprises a plurality of pin electronics modules coupled together via a high-speed bus.

In one embodiment, the testing device comprises a plurality of pin electronics modules having a plurality of bridge components, wherein each bridge component comprises two half bridge components, and wherein each half bridge component includes a pin map memory.

In one embodiment, the testing device comprises a plurality of pin electronics modules, and wherein each of the pin electronics modules is configured to couple to a plurality of devices under test.

In one embodiment, the testing device comprises a plurality of pin electronics modules, and wherein the pin electronics modules can be configured to support different combined resource modes of operation.

In one embodiment, the testing device comprises a plurality of pin electronics modules, and wherein the pin electronics modules can be configured to support different combined resource modes of operation including the use of a plurality of CPUs and a plurality of bridge components.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
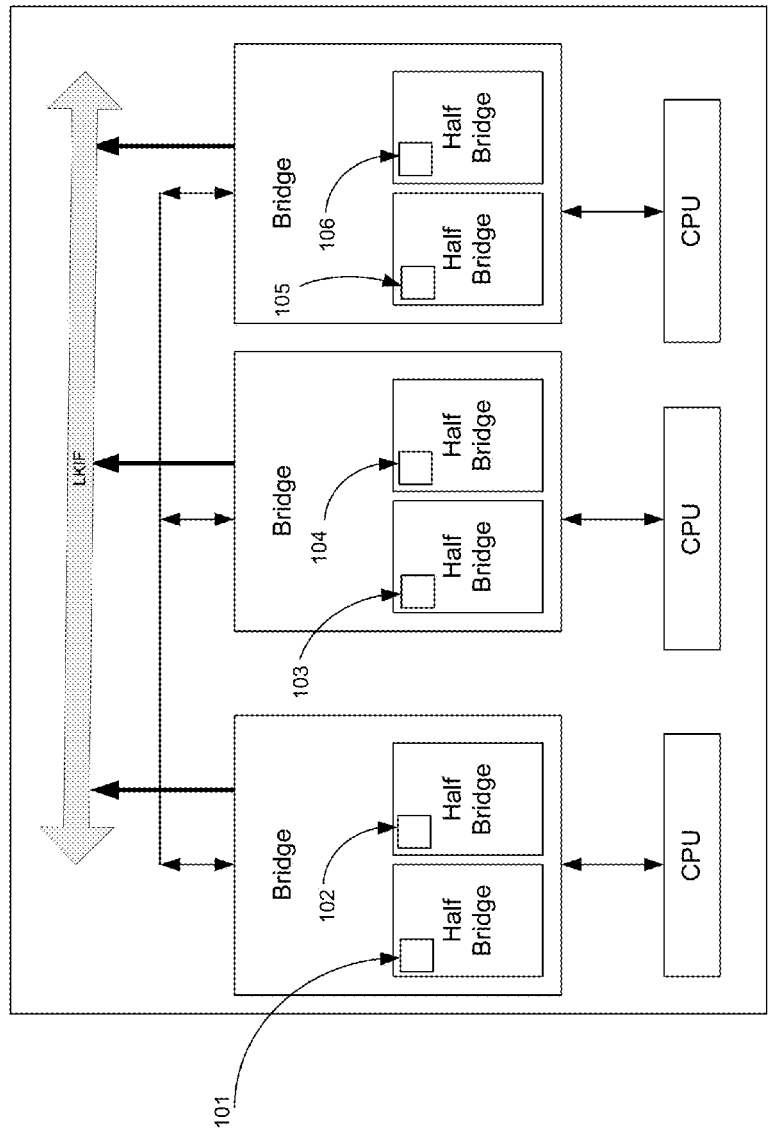
FIG. 1 shows a PEM communication bus structure in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as " processing" or "accessing" or " executing" or " storing" or "rendering" or the like, refer to the action and processes of a computer system (e.g., computer system 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

Embodiments of the present invention implement a distributed pin mapping architecture that efficiently supports flexible combined resource modes of execution. The distributed pin mapping architecture supports combined resource modes of execution by removing performance bottlenecks inherent in architectures with a single pin map memory. This allows even very large combined resource modes that span multiple pin electronics modules and include multiple CPUs to perform efficiently.

By distributing the pin map memory across each of the bridge components, embodiments of the present invention implement a large-scale testing functionality (e.g., where many devices are under test simultaneously) using a plurality of CPUs and a corresponding plurality of bridge components to allow the CPUs to function cooperatively and in parallel.

FIG. 1 shows a PEM communication bus structure in accordance with one embodiment of the present invention. As depicted in FIG. 1, the pin electronics module (e.g., PEM) includes three bridge components coupled to three corresponding CPUs. The communication between the CPUs and the bridges can be implemented using standardized serial communications (e.g., PCI express, etc.). Each bridge includes two half bridges as shown. Each bridge is coupled to communicate with each other bridge on the pin electronics module, as shown. Each bridge is also coupled to communicate with a high-speed interconnect. In this implementation, a Link Bus 2 interface (LKIF) is shown. The Link Bus 2 interface is used to enable communication between bridges mounted on the other pin electronics modules.

The FIG. 1 embodiment shows a plurality of distributed pin maps 101-106, with one pin map within each half bridge component of each bridge. By distributing the pin map memory over the multiple half bridges, each connected to a local CPU, pin map bottlenecking is eliminated. By the design of the pin map memory, operations can be forwarded to other bridges, including those bridges on other pin electronics modules. In so doing, each of the bridges can perform pin map decoding for its own local resources. This avoids the requirement of making any one pin map memory excessively large while retaining combined resource mode flexibility.

As used herein, pin mapping describes a way to arbitrarily group sets of resources together so that they can be accessed in a single operation (e.g., a single read or write operation). In one implementation, up to 1k different groups, each of those groups can contain an arbitrary selection of pin resources (e.g., pin one, pin nine, pin 97, and the like). The user defines the contents of the groups by programming.

Although the pin maps 101-106 are shown here as being implemented within the half bridges, embodiments are possible where the pin map memory functionality component resides within each bridge, as opposed to each half bridge.

The FIG. 1 embodiment also shows a legend detailing the different combined resource modes (CRM) that can be implemented by the pin electronics module. Combined resource modes allow the pin electronics module to dedicate more resources to solve different tasks. The amount of resources that can be dedicated can be varied in accordance with the difficulty of a given task. For example, CRM1 is a configuration of one half bridge sharing a single CPU, while CRM12 is a configuration of 12 half bridges with the master CPU and five slave CPUs.

Figure 2:
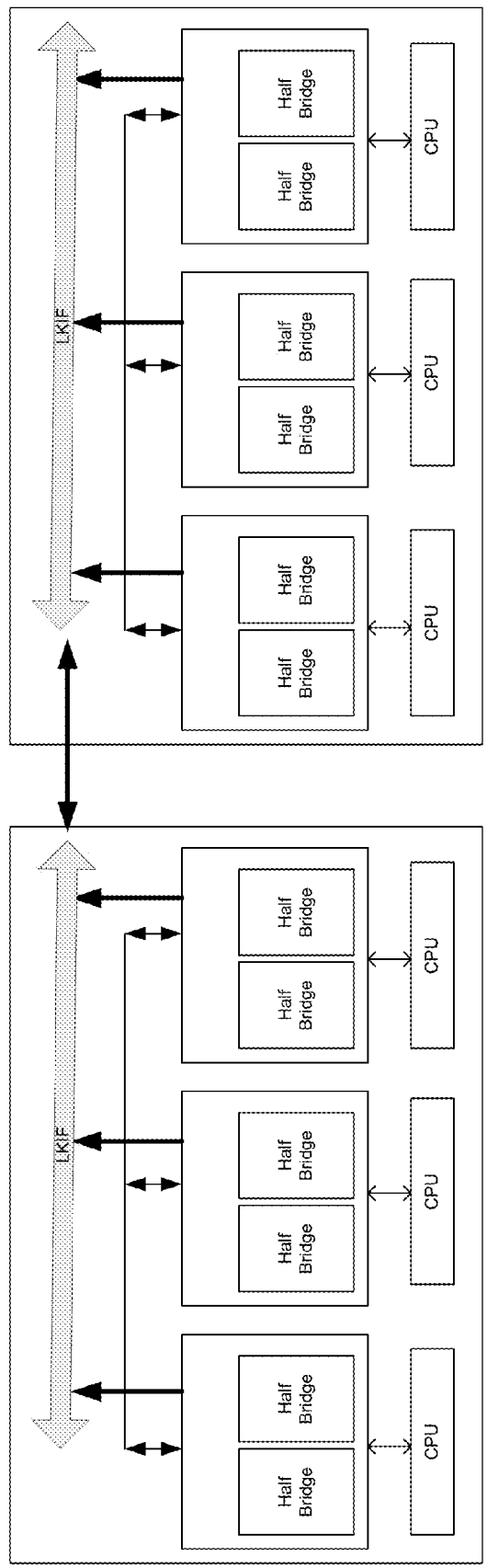
FIG. 2 shows a PEM communication bus structure implementing communication between two different pin electronics modules in accordance with one embodiment of the present invention.

FIG. 2 shows a PEM communication bus structure implementing communication between two different pin electronics modules in accordance with one embodiment of the present invention. In this manner, FIG. 2 shows how a large number of pin electronics modules can be linked together via the Link Bus 2 interface.

It should be noted that normally the data from the pin map memory is used on-the-fly to route the read/write operation to the necessary resources. Requests made by a master CPU are routable to any resources within a selected CRM group. Requests made by a satellite CPU, for example via LKIF, are routable to any resources on the PEM. Requests made by any slave CPU are only routable to resources controlled by that Bridge.

In this manner, embodiments of the present invention support flexible "CRM" modes, which allow for tester resources, to be generated by hardware under the control of both a local (slave) CPU and a, possibly different, remote master CPU. The pin mapping memories are distributed. This enables the pin mapping functionality to be performed locally for each CPU.

Figure 3:
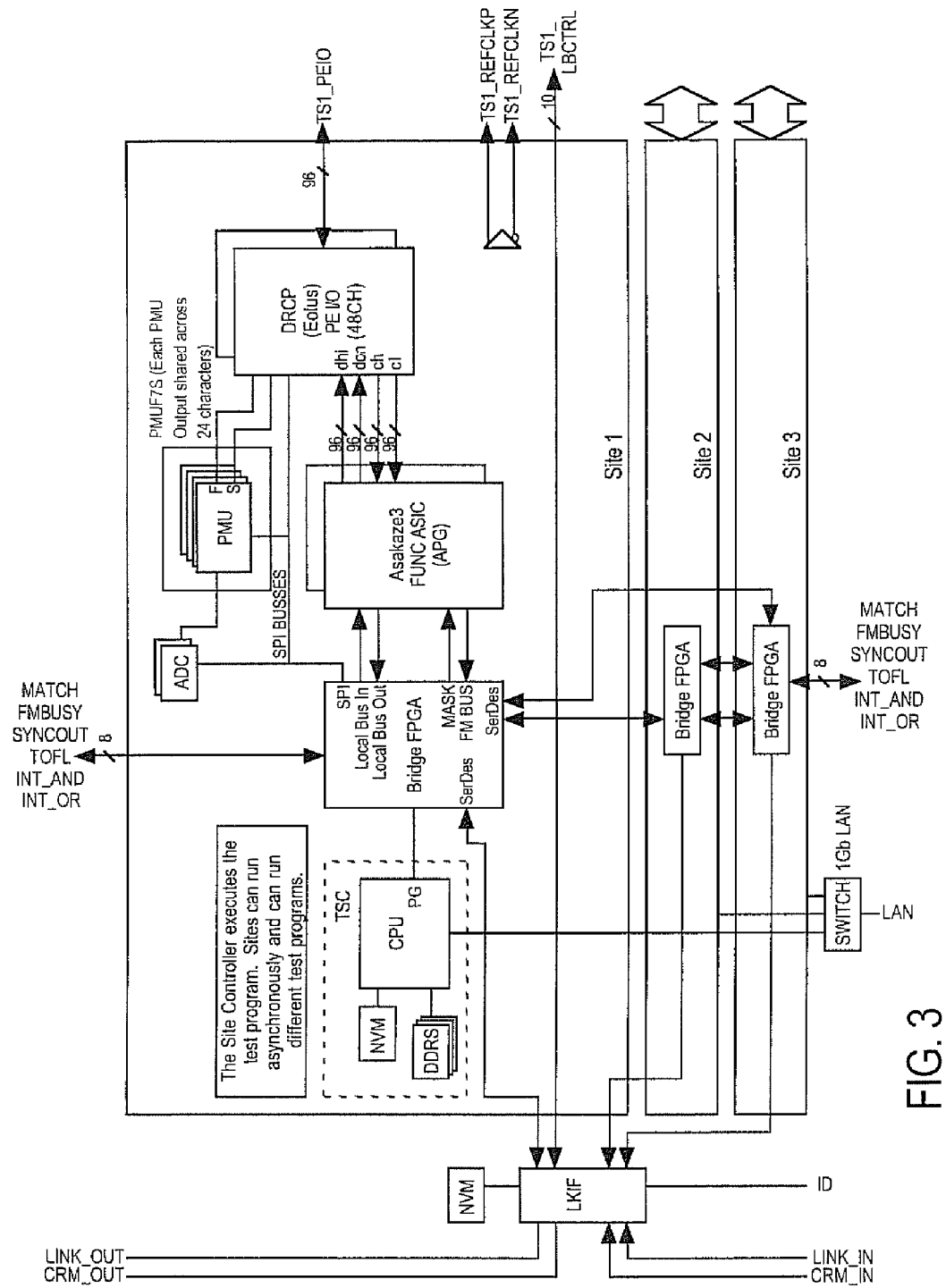
FIG. 3 shows an overview diagram of an exemplary FPGA-based pin electronics module in accordance with one embodiment of the present invention.

FIG. 3 shows an overview diagram of an exemplary FPGA-based pin electronics module in accordance with one embodiment of the present invention. FIG. 3 shows a test site controller coupled to a bridge FPGA. Pluralities of devices under test are coupled to receive the buses coming off of the right-hand side of the pin electronics module.

Computer System Platform

Figure 4:
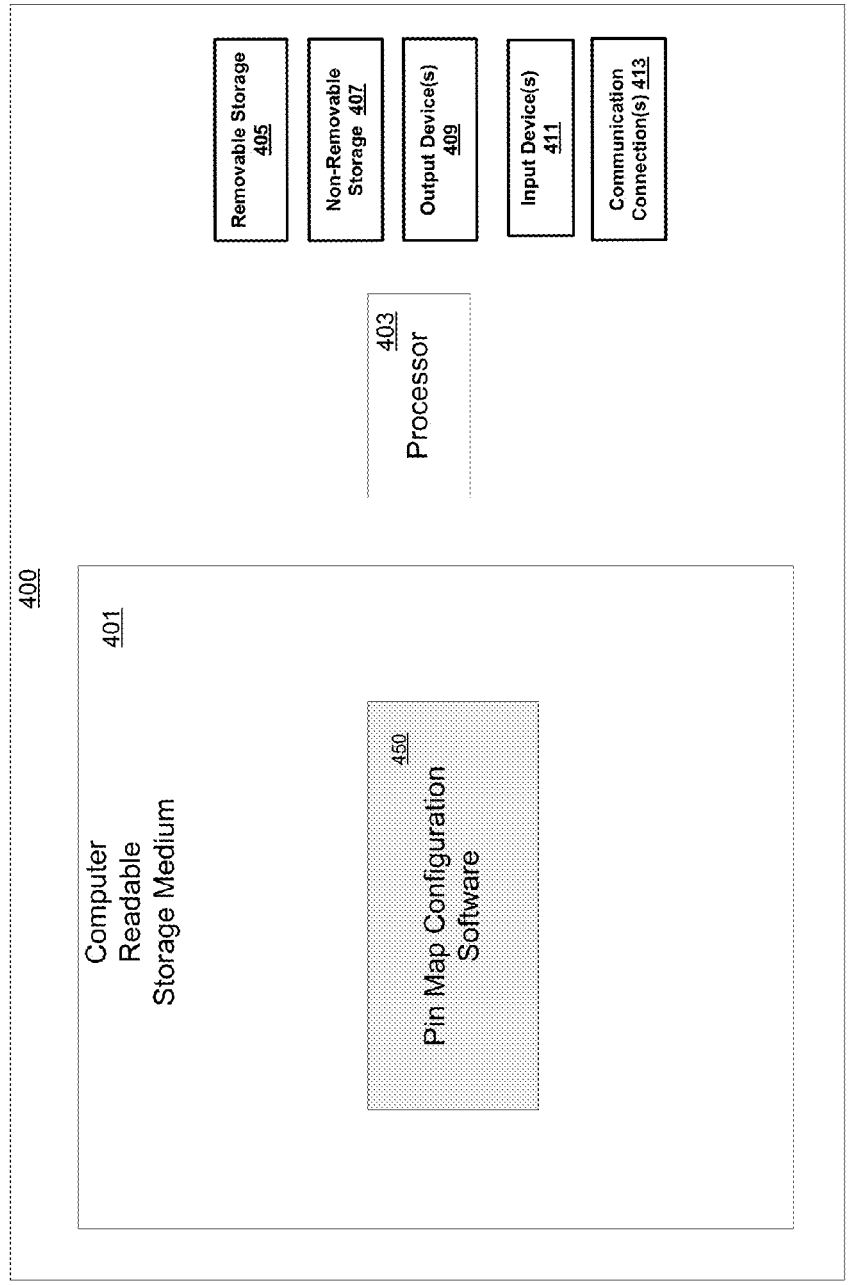
FIG. 4 shows an exemplary computer system according to one embodiment.

FIG. 4 shows an exemplary computer system 400 according to one embodiment. Computer system 400 depicts the components of a basic computer system providing the execution environment for certain hardware-based and software-based functionality for the above described embodiments. Computer system 400 can be implemented as, for example, a server computer system, workstation computer system, desktop computer system, or laptop computer system. Similarly, computer system 400 can be implemented as a handheld device. Computer system 400 typically includes at least some form of computer readable media (e.g., computer readable storage medium 401). Computer readable media can be a number of different types of available media that can be accessed by computer system 400 and can include, but not limited to, computer storage media.

In its most basic configuration, computer system 400 typically includes processing unit 403 and a computer readable storage medium 401. Depending on the exact configuration and type of computer system 400 that is used, memory 401 can be volatile (e.g., such as DRAM, etc.) 401*a,* non-volatile 401*b* (e.g., such as ROM, flash memory, etc.) or some combination of the two. Similarly, the memory 401 can comprise other devices besides solid-state devices, such as, for example, magnetic disk-based media, optical media, or the like.

Additionally, computer system 400 can include other mass storage systems (e.g., removable 405 and/or non-removable 407) such as magnetic or optical disks or tape. Similarly, computer system 400 can include input devices 409 and/or output devices 411 (e.g., such as a display). Computer system 400 can further include network connections 413 to other devices, computers, networks, servers, etc. using either wired or wireless media. As all of these devices are well known in the art, they need not be discussed in detail.

It should further be noted, that the computer system 400 can have some, most, or all of its functionality supplanted by a distributed computer system having a large number of dispersed computing nodes, such as would be the case where the functionality of the computer system 400 is partly or wholly executed using a cloud computing environment.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a testing device, a method for implementing distributed pin mapping, comprising:
   receiving a request from a plurality of CPUs to access a pin map memory at each of a plurality of bridges;
   implementing accesses to the pin map memories locally at each of the plurality of bridges; and
   using pin map data from the accesses to the plurality of CPUs to enable access to testing device resources.

2. The method of claim 1, wherein the testing device comprises a plurality of pin electronics modules.

3. The method of claim 1, wherein the testing device comprises a plurality of pin electronics modules and each of the pin electronics modules includes a plurality of bridge components and a plurality of CPUs.

4. The method of claim 1, wherein the testing device comprises a plurality of pin electronics modules coupled together via a high-speed bus.

5. The method of claim 1, wherein the testing device comprises a plurality of pin electronics modules having a plurality of bridge components, wherein each bridge component comprises two half bridge components, and wherein each half bridge component includes a pin map memory.

6. The method of claim 1, wherein the testing device comprises a plurality of pin electronics modules, and wherein each of the pin electronics modules is configured to couple to a plurality of devices under test.

7. The method of claim 1, wherein the testing device comprises a plurality of pin electronics modules, and wherein the pin electronics modules can be configured to support different combined resource modes of operation.

8. The method of claim 1, wherein the testing device comprises a plurality of pin electronics modules, and wherein the pin electronics modules can be configured to support different combined resource modes of operation including the use of a plurality of CPUs and a plurality of bridge components.

9. A non-transitory computer readable memory having computer readable code which when executed by a computer system causes the computer system to implement a method for implementing distributed pin map access, comprising:
   receiving a request from a plurality of CPUs to access a pin map memory at each of a plurality of bridges;
   implementing accesses to the pin map memories locally at each of the plurality of bridges; and
   using pin map data from the accesses to the plurality of CPUs to enable access to testing device resources.

10. The computer readable memory of claim 9, wherein the testing device comprises a plurality of pin electronics modules.

11. The computer readable memory of claim 9, wherein the testing device comprises a plurality of pin electronics modules and each of the pin electronics modules includes a plurality of bridge components and a plurality of CPUs.

12. The computer readable memory of claim 9, wherein the testing device comprises a plurality of pin electronics modules coupled together via a high-speed bus.

13. The computer readable memory of claim 9, wherein the testing device comprises a plurality of pin electronics modules having a plurality of bridge components, wherein each bridge component comprises two half bridge components, and wherein each half bridge component includes a pin map memory.

14. The computer readable memory of claim 9, wherein the testing device comprises a plurality of pin electronics modules, and wherein each of the pin electronics modules is configured to couple to a plurality of devices under test.

15. The computer readable memory of claim 9, wherein the testing device comprises a plurality of pin electronics modules, and wherein the pin electronics modules can be configured to support different combined resource modes of operation.

16. The computer readable memory of claim 9, wherein the testing device comprises a plurality of pin electronics modules, and wherein the pin electronics modules can be configured to support different combined resource modes of operation including the use of a plurality of CPUs and a plurality of bridge components.

17. In a testing device, a method for implementing distributed pin map access, comprising:
   receiving a request from a plurality of CPUs to access a pin map memory at each of a plurality of bridges;
   implementing accesses to the pin map memories locally at each of the plurality of bridges; and
   using pin map data from the accesses to the plurality of CPUs to enable access to testing device resources.

18. The method of claim 17, wherein the testing device comprises a plurality of pin electronics modules, and wherein the pin electronics modules can be configured to support different combined resource modes of operation.

19. The method of claim 17, wherein the testing device comprises a plurality of pin electronics modules, and wherein the pin electronics modules can be configured to support different combined resource modes of operation including the use of a plurality of CPUs and a plurality of bridge components.

* * * * *